(12) United States Patent
Seufert et al.

(10) Patent No.: US 9,449,436 B2
(45) Date of Patent: Sep. 20, 2016

(54) METHOD AND CONTROL DEVICE FOR A DRIVE TRAIN COMPONENT (71) Applicant: GETRAG Getriebe- und Zahnradfabrik Hermann Hagenmeyer GmbH & Cie KG, Untergruppenbach (DE)

(72) Inventors: Martin Seufert, Steinheim (DE); Ralf Hettich, Filderstadt (DE); Tobias Kalisch, Villingen-Schwenningen (DE); Michael Ludwig, Reihen (DE); Heiko Söhner, Bad Friedrichshall (DE)

(73) Assignee: GETRAG Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 72 days.

(21) Appl. No.: 14/063,577

(22) Filed: Oct. 25, 2013

(65) Prior Publication Data
US 2014/0052326 A1 Feb. 20, 2014

Related U.S. Application Data (63) Continuation of application No. PCT/EP2013/052796, filed on Feb. 12, 2013.

(30) Foreign Application Priority Data

Feb. 15, 2012 (DE) ........................ 10 2012 003 328

(51) Int. Cl.
*F16D 48/10* (2006.01)
*G07C 5/08* (2006.01)
(Continued)

(52) U.S. Cl.
CPC ........... *G07C 5/0808* (2013.01); *F16D 48/064* (2013.01); *F16H 61/12* (2013.01);
(Continued)

(58) Field of Classification Search
None
See application file for complete search history.

(56) References Cited

U.S. PATENT DOCUMENTS 5,493,928 A  2/1996 Mitchell
5,602,735 A * 2/1997 Wada .............................. 701/41
(Continued)

FOREIGN PATENT DOCUMENTS

CN  101463900  6/2009
CN  101517259  8/2009
(Continued)

OTHER PUBLICATIONS

Written Opinion & International Search Report for PCT/EP2013/052796 dated May 14, 2013, 9 pages.
(Continued)

*Primary Examiner* — Rami Khatib
*Assistant Examiner* — Navid Ziaeianmehdizadeh
(74) *Attorney, Agent, or Firm* — Reising Ethington P.C.

(57) ABSTRACT

A method for actuating a component of a drive train of a motor vehicle. The component is mechanically prestressed into a safe state. The method has the steps: sensing a fault state; sensing whether the fault state is a first or second type of fault state; immediate interruption of the actuation of the component so that the component is passively transferred into the safe state by the mechanical prestress if the fault state, is of the first type of fault state, or actuation of the component in such a way that the component is actively transferred into the safe state if the fault state is of the second type of fault state.

23 Claims, 3 Drawing Sheets (51) Int. Cl.
  *F16H 61/688* (2006.01)
  *F16D 48/06* (2006.01)
  *F16H 61/12* (2010.01)

(52) U.S. Cl.
  CPC ... *F16H 61/688* (2013.01); *F16D 2500/1086* (2013.01); *F16D 2500/5114* (2013.01); *F16H 2061/1232* (2013.01); *F16H 2061/1268* (2013.01)

(56) References Cited

U.S. PATENT DOCUMENTS

| | | | |
|---|---|---|---|
| 5,632,706 | A | 5/1997 | Kremmling |
| 5,908,460 | A | 6/1999 | Amisano |
| 6,205,390 | B1 * | 3/2001 | Holbrook et al. ............... 701/62 |
| RE37,572 | E | 3/2002 | Kremmling |
| 6,466,852 | B2 | 10/2002 | Frohlich |
| 6,948,395 | B2 | 9/2005 | Gierer |
| 7,039,515 | B2 | 5/2006 | Eich |
| 7,058,497 | B2 | 6/2006 | Nagata |
| 7,218,120 | B2 * | 5/2007 | Shimoyama et al. ........ 324/523 |
| 8,108,113 | B2 | 1/2012 | Seufert |
| 8,162,115 | B2 | 4/2012 | Seufert |
| 8,469,860 | B1 * | 6/2013 | Kaminsky et al. ............. 477/79 |
| 8,571,775 | B2 | 10/2013 | Zimmermann |
| 8,620,513 | B2 | 12/2013 | Seufert |
| 9,002,603 | B2 * | 4/2015 | Arnold et al. .................. 701/58 |
| 2002/0022917 | A1 * | 2/2002 | Frohlich et al. ................ 701/62 |
| 2004/0010361 | A1 * | 1/2004 | Gierer et al. ................... 701/62 |
| 2007/0123388 | A1 | 5/2007 | Petrzik et al. |
| 2008/0006107 | A1 * | 1/2008 | Dreher et al. .................. 74/329 |
| 2009/0105917 | A1 * | 4/2009 | Schweizer ...................... 701/67 |
| 2009/0255773 | A1 * | 10/2009 | Seufert et al. ............... 192/48.2 |
| 2010/0042302 | A1 | 2/2010 | Fritzer et al. |
| 2010/0241325 | A1 * | 9/2010 | Glatthaar et al. .............. 701/58 |
| 2010/0305802 | A1 * | 12/2010 | Seufert et al. .................. 701/29 |
| 2011/0054754 | A1 * | 3/2011 | Zimmermann et al. ........ 701/68 |
| 2011/0144925 | A1 * | 6/2011 | Long et al. ..................... 702/35 |
| 2011/0203682 | A1 | 8/2011 | Ishikawa |

FOREIGN PATENT DOCUMENTS

| | | |
|---|---|---|
| CN | 101981354 | 2/2011 |
| DE | 19538495 | 4/1996 |
| DE | 19743089 A1 | 4/1999 |
| DE | 4438144 | 7/1999 |
| DE | 19947025 A1 | 3/2001 |
| DE | 69705657 T2 | 5/2002 |
| DE | 10237167 A1 | 3/2003 |
| DE | 10310831 A1 | 11/2003 |
| DE | 10231819 A1 | 2/2004 |
| DE | 10346922 A1 | 4/2004 |
| DE | 102004018962 B3 | 10/2005 |
| DE | 102006022858 A1 | 11/2007 |
| DE | 102006054253 A1 | 5/2008 |
| DE | 102007056512 A1 | 5/2009 |
| DE | 102007063212 | 6/2009 |
| DE | 102008008065 A1 | 8/2009 |
| DE | 102011010512 A1 | 8/2011 |
| DE | 102011011224 A1 | 9/2011 |
| EP | 1847732 A2 | 10/2007 |
| GB | 2280721 A | 2/1995 |
| GB | 2344386 | 6/2000 |
| WO | WO2007131763 A1 | 11/2007 |
| WO | WO2008049606 A1 | 5/2008 |

OTHER PUBLICATIONS

International Preliminary Report on Patentability and Written Opinion for the International Searching Authority for PCT/EP2013/052796 dated Aug. 19, 2014, 7 pages.

English translation of Chinese Office Action dated Jun. 23, 2015, 11 pages.

European Opposition for Application No. 13703812.1 Dated Jun. 10, 2016, 30 pages.

* cited by examiner

METHOD AND CONTROL DEVICE FOR A DRIVE TRAIN COMPONENT

CROSS REFERENCES TO RELATED APPLICATIONS

This application is a continuation of international patent application PCT/EP 2013/052796, filed on Feb. 12, 2013 designating the U.S., which international patent application has been published in the German language and claims priority from German patent application DE 10 2012 003 328.1, filed on Feb. 15, 2012. The entire contents of these priority applications are incorporated herein by reference.

BACKGROUND

The present invention relates to a method for actuating a component of a drive train of a motor vehicle, wherein the component is mechanically prestressed into a safe state, and also relates to a control device for carrying out such a method.

In the field of drive trains for motor vehicles there is a trend for adjustable components to be activated by means of electronically actuated actuators. The components can be a part of the drive engine (for example a throttle valve), but are, in particular, components which are arranged downstream of the drive engine in the direction of the power flux, such as starter clutches, transmissions, differentials, etc.

The actuators in this context can be fluidic or electromechanical actuators.

Since more stringent demands are made of safety in motor vehicle drive trains, generally safety systems are provided, which, when faults occur in the electronic actuation, are intended to transfer the affected component or the drive train into a safe state. Depending on the component, it is desired or required here in terms of safety technology that the component be transferred into a safe state within a safety time period (process safety time). If the activation of the component can lead, for example, to stresses in the drive train, the transfer into a safe state can prevent grip being lost between a driven wheel and an underlying track surface.

A safe state can mean here, for example, that the component is opened with the result that drive power can no longer be transmitted via said component. However, in many cases the safe state is associated with closing a component. For example, in this way in many cases a loss of tractive force can be prevented, which loss could be problematic for safety under certain circumstances during an overtaking process (see, for example, DE 10 2004 018 962 B3). From this document it is known, when a type of fault occurs in a double clutch transmission, to keep that clutch via which a relatively high torque can be transmitted closed.

Document DE 10 2006 054 253 A1 proposes that when an interference signal occurs both clutches of a double clutch transmission are firstly opened, and when a safe basic state is reached pressure is applied again to one of the two clutches. Under certain circumstances, there is intervention into the actuation of the drive engine.

In the case of a processor fault, a control device for actuating the component is reset. This generally leads to the outputs of the control device being switched off. In such a case, the safe state is achieved by the mechanical prestress of the component. From document WO 2008/049606 A1 it is known to provide, independently of the control device, a piece of safety hardware which is connected to an actuator arrangement in parallel with the control device and is configured to supply, in the case of a fault state, the actuator arrangement with electrical power independently of the control device in order to transfer a component in the form of a separation clutch into a safe state (for example to open said component).

If the actuator arrangement has an electric motor in the event of a fault the mechanical prestress must consequently not entrain the electric motor. Instead, the safe state is achieved by reversing the direction of rotation of the electric motor which assists the mechanical prestress for reaching the safe state.

SUMMARY

Against the above background, an object of the invention is to specify an improved method for actuating a component of a drive train of a motor vehicle or an assigned control device with which a high level of processing safety with low expenditure can be achieved.

Said object is achieved by a method for actuating a component of a drive train of a motor vehicle, wherein the component is mechanically prestressed into a safe state, having the steps of firstly sensing a fault state and sensing whether the fault state is a first or second type of fault state, wherein the actuation of the component is interrupted immediately so that the component is passively transferred into the safe state by the mechanical prestress if the fault state is of the first type of fault state, or wherein the component is actuated in such a way that the component is actively transferred into the safe state on the basis of the actuation if the fault state is of the second type of fault state.

In addition, the above object is achieved by means of a control device, in particular for controlling a component of a drive train of a motor vehicle, wherein a method according to the invention is implemented in the control device.

According to the invention, a differentiation is consequently made between different fault states. The fault states can be of differing degrees of severity here and/or require different measures in terms of safety technology.

When the first type of fault state occurs, the actuation is immediately interrupted with the result that it is possible within a safety time period (process safety time) to transfer the component passively into the safe state solely by means of the mechanical prestress, to be precise preferably even if in the process an actuator system has to be entrained.

If, on the other hand, the second type of fault state occurs, the component can be actively actuated in such a way that it is transferred into the safe state. This can be done by means of the method or the control device itself, with the result that additional and costly safety hardware is not necessary.

In practice, the first type of fault state will occur relatively rarely, with the result that in such cases early switching off of the actuation of the component can be justified.

In contrast, in the case of the more frequently occurring second type of fault state, a fault state can be "tolerated" for longer since the component can be transferred relatively quickly into the safe state on the basis of the active actuation.

Accordingly, on the basis of this relatively high tolerance threshold unnecessary resetting of the control device can be avoided. In a control device, there is, in addition to control software, preferably safety software implemented which can detect safety-critical states independently of the control software. In this context, the safety software checks, as it were, the function of the control software and can, for example when the second type of fault state occurs, independently initiate actuation of the component while bypassing the control software with the result that the component is transferred actively into the safe state.

In other words, when a safety-critical fault occurs it is possible by means of the method according to the invention for a safe state to occur within a permissible safety time period (process safety time). Mainly (in the second type of fault state), the component is actuated here by means of an actuator system in such a way that the component is actively transferred into the safe state. Such faults which cause software actuation to be no longer possible (for example in the first type of fault state) can be detected here so early that the safe state can also be reached passively (by means of the mechanical prestress).

In this context, when a safety-critical fault is detected, the actuation is not interrupted (switching off of the outputs of the control device) in every case, but instead, under certain circumstances, an action takes place in a targeted fashion in order to adjust the drive train quickly into the safe state. In this context, the actuator arrangements which are less dynamic (for example electric motors) are also suitable. The expenditure on separate safety hardware is eliminated. The active actuation of the component when the second type of fault state occurs can preferably be programmed freely with respect to signal size and duration.

The safety software is implemented on the control device preferably independently of the control software and preferably is of such a standard that software faults should not occur in the safety software. The control software is generally complex software with complex control algorithms for actuating the component taking into account various driving states and the states of other components of the drive train. The control software can activate not only one component but, under certain circumstances, a plurality of components of the drive train.

Owing to the complexity of the control software the possibility of said software going into a fault state ("sticking") is not ruled out. This is detected by the safety software. Although the active actuation of the component for reaching the safe state also means that the safety software can control the component, the functional scope which is implemented for this purpose in the safety software may be significantly smaller and may be limited, for example, to a single sequence for transferring the component into the safe state. The functional scope for actuating the component is consequently smaller in the safety software than in the control software.

The object is therefore completely achieved.

The first type of fault state preferably includes fault states which can no longer be overcome by the safety software.

According to one embodiment, the first type of fault state consequently includes a processor fault of a control device, to be precise, in particular, a processor fault of a control device by means of which the actuation method is carried out and on which, under certain circumstances, the safety software is also implemented.

According to a further embodiment, the first type of fault state includes an energy supply fault, in which the energy supply for a control device is faulty.

This is generally interrogated by means of a separate energy supply monitoring device.

Accordingly, it is advantageous if the first and/or the second type of fault state is sensed by a monitoring device which monitors a processor of a control device and/or an energy supply of the control device.

A monitoring device for monitoring the processor may be, for example, a "watchdog" module. The monitoring device for monitoring the energy supply may be a separate module which is, under certain circumstances, connected to a watchdog module.

According to a further preferred embodiment, the second type of fault state includes a software fault in a control software section.

The control software section is in this context preferably a superordinate control software section (high-level software) and is preferably implemented on a processor of the control device.

According to a further preferred embodiment, the first and/or the second type of fault state is sensed by a safety software section.

The safety software section is also preferably superordinate software (high-level software) here and is preferably installed on a processor, preferably on the same processor as the control software section.

A processor is understood here to be any type of architecture, that is to say processors with one or more cores, multi-processor systems, etc. The processor is particularly preferably a single device and particularly preferably a microcontroller.

In addition, it is advantageous if the control software section is connected to an output software section which outputs signals at at least one processor output.

Such an output software section may be implemented as subordinate software (low-level software). However, the output software section is preferably implemented as a safety-relevant software section, in a similar form to the safety software section. For this reason, the output software section can preferably still be active ("run") on the processor even if the control software section is in a fault state (has become "stuck").

Signals for activating the component of the drive train are preferably output by the output software section.

In this context it is particularly preferred if the safety software section is connected to the output software section in order to carry out the active state transfer into the safe state.

In other words, when the second type of fault state occurs, an active transfer into the safe state is carried out in that the safety software section transfers prescriptions for reaching the safe state to the output software section, which then outputs the corresponding signals for transferring the component into the safe state at at least one processor output.

In this context, according to one embodiment, it is possible that the output software section outputs control signals at the at least one processor output, which control signals are converted by means of actuation hardware into actuation signals for an actuator for activating the component.

In the event of the actuator arrangement containing an electric motor, the actuation signals can be, for example, three-phase signals for power electronics (output stage) of the electric motor, which electronics include, for example, a semiconductor bridge circuit.

The control signals may be in this context electric-motor-specific prescriptions in terms of rotational speed and/or direction of rotation. The actuation hardware is preferably implemented as a separate hardware module, for example in the form of an ASIC, and is, for example, implemented on an electric-motor-specific basis, with the result that prescriptions with respect to the rotational speed and/or direction of rotation are converted into the corresponding three-phase signals for the power electronics in a way which is specific to the electric motor used.

In such a case, it is preferably possible to dispense with such complex conversion logic within the processor of the control device.

In this case, the output software section generates, for example, signals relating to the component (for example actuation path of a clutch) and converts them into the corresponding control signals which are output at the processor output.

According to an alternative embodiment, which constitutes a separate invention independently of the differentiation mentioned at the beginning between the first and second types of fault state, an output software section is installed on a processor of a control device for activating a component of a drive train, which output software section is configured and/or designed to convert control signals into actuation signals which can be used directly to actuate an actuator arrangement for activating the component.

In this embodiment, the conversion of control signals such as the direction of rotation and rotational speed of an electric motor into actuation signals does not take place within a separate module (ASIC) but instead within the output software section. At the at least one processor output, the actuation signals (such as, for example, three-phase signals for an output stage of an electric motor) can be output here.

In this embodiment, a separate module for converting the control signals into actuation signals is not necessary, with the result that the hardware expenditure is reduced.

Overall, it is preferred if the mechanical prestress is configured in such a way that the passive state transfer into the safe state takes place within a first predefined time period which is shorter than a safety time period minus a first fault detection time period.

The first fault detection time period can be relatively short here.

According to a further preferred embodiment, actuation dynamics of the component are configured in such a way that the active state transfer into the safe state takes place within a second predefined time period which is shorter than a safety time period (process safety time) minus a second fault detection time period.

The second fault detection time period can be longer here than the first fault detection time period, with the result that when the second type of fault state occurs a relatively high tolerance with respect to faults is given and it is possible to dispense with safety measures over a relatively long time period (second fault detection time period). This can have the result that a driver of the motor vehicle is troubled less by failures, faults or fault messages. This increases the comfort of the motor vehicle overall.

As explained above, the actuator arrangement can include, for the activation of the component, a fluidic actuator arrangement (hydraulic or pneumatic) or an electromechanical actuator. The electromechanical actuator can be an electromagnetic actuator. However, it is particularly preferred if the actuator is an electric motor.

The component can be a clutch or a brake in a transmission of a drive train, such as for example a clutch in an automated transmission or a separation clutch in a double clutch transmission. However, the component can also be accommodated within the actual transmission, for example in the form of a shift clutch for engaging and disengaging gear speeds and/or for engaging and disengaging a parking lock. However, the component can also be, for example, a longitudinal locking clutch in all-wheel drive trains and/or a transverse locking clutch, as well as a torque vectoring clutch.

If a control software section, a safety software section and an output software section are implemented on a processor, the safety software section is preferably prioritized over the control software section during the conversion of requests to the output software section.

Of course, the features mentioned above and the features which are still to be explained below can be used not only in the respectively specified combination but also in other combinations or alone without departing from the scope of the present invention.

BRIEF DESCRIPTION OF THE DRAWINGS

Exemplary embodiments of the invention are illustrated in the drawing and will be explained in more detail in the following description, in which.

DETAILED DESCRIPTION OF PREFERRED EMBODIMENTS

Figure 1:
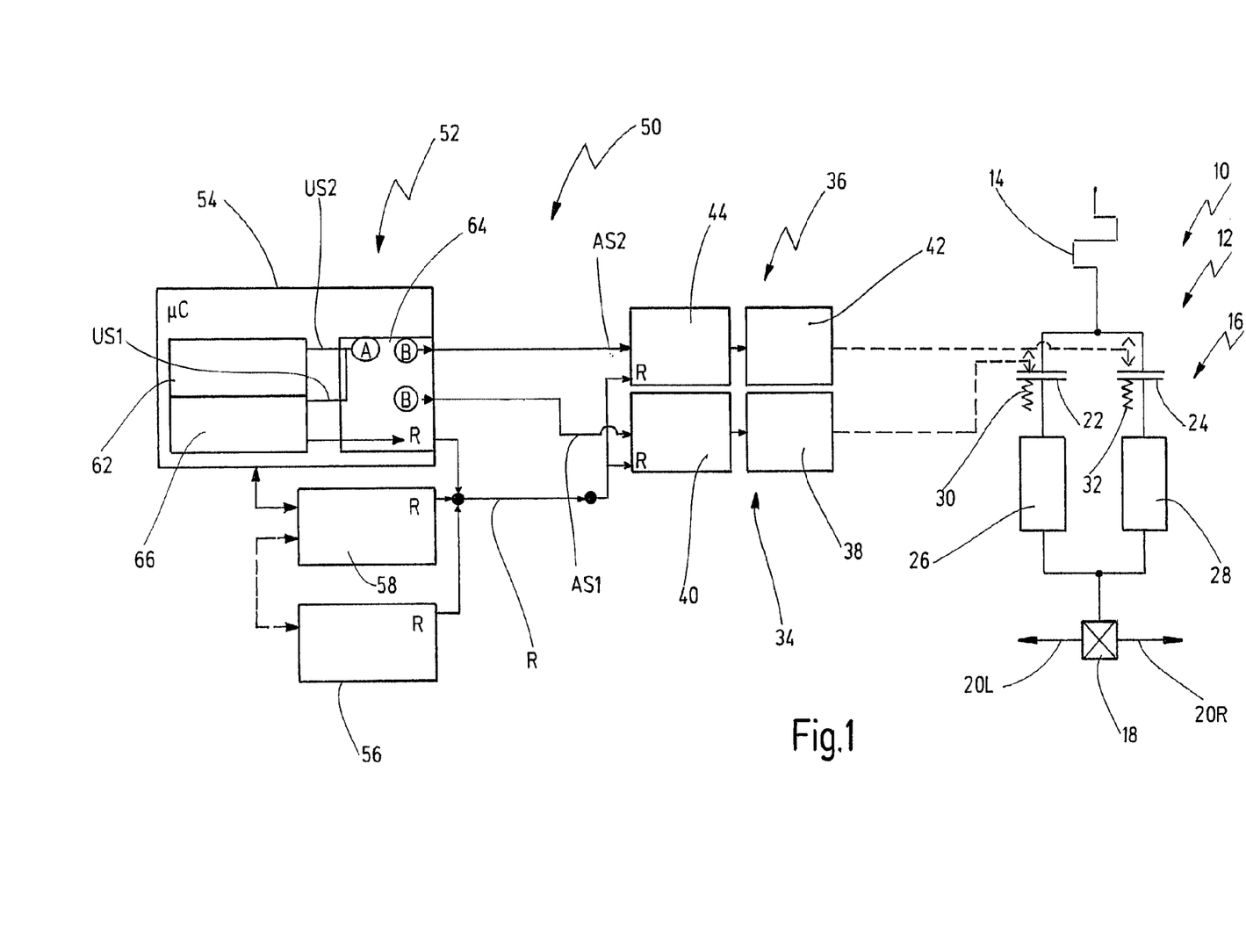
FIG. 1 shows a schematic illustration of a motor vehicle drive train with a control arrangement.

FIG. 1 shows a schematic illustration of a motor vehicle 10 whose drive train is generally denoted by 12.

The drive train 12 has a drive engine 14 such as an internal combustion engine or a hybrid drive engine. A drive shaft of the drive engine 14 is connected to an input of a double clutch transmission 16. An output of the double clutch transmission 16 is connected to a differential 18 which distributes drive power to driven wheels 20L, 20R of the motor vehicle 10. The differential 18 can be a mechanical differential, but also a twin clutch differential with two friction clutches which can be actuated independently of one another.

The double clutch transmission 16 includes a friction clutch 22 and a second friction clutch 24 whose common input element is connected to the output shaft of the drive engine 14. In addition, the double clutch transmission 16 has a first component transmission 26, which is assigned, for example, to the uneven-numbered gear speed stages 1, 3, 5, . . . . A second component transmission 28 of the double clutch transmission 16 is then assigned, for example, the even-numbered gear speed stages 2, 4, 6, . . . . An input element of the first component transmission 26 is connected to an output element of the first friction clutch 22. An input element of the second component transmission 28 is connected to an output element of the second friction clutch 24. A common output of the component transmissions 26, 28 is connected to an input element of the differential 18.

The first friction clutch 22 is prestressed by means of a first prestressing spring 30 into a safe state which may be a closed state of the friction clutch 22, which is, however, preferably an open state of the friction clutch 22 in which the latter can transmit no drive torque, or essentially no drive torque ("normally open"). In a corresponding way, the second friction clutch 24 is prestressed into a safe state by means of a second prestressing spring 32.

The friction clutches 22, 24 can be embodied as dry friction clutches or else as wet-running friction clutches.

The first friction clutch 22 is activated by means of a first actuator arrangement 34. The second friction clutch 24 is activated by means of a second actuator arrangement 36. The actuator arrangements 34, 36 may be fluidic actuator arrangements, but are preferably electromechanical actuator arrangements. In the present case, the first actuator arrangement 34 contains a first actuator 38 in the form of an electric motor which is actuated by means of a first output stage 40 (first power electronics). In a corresponding way, the second actuator arrangement 36 contains a second actuator 42 in the form of an electric motor which is actuated by means of a second output stage 44. The electric motors 38, 42 are preferably brushless motors such as, for example, permanently excited direct current motors. In addition, the electric motors 38, 42 can preferably be driven in both directions of rotation.

The drive train 12 also contains a control arrangement 50. The control arrangement 50 has a control device 52 by means of which the actuator arrangements 34, 36 are actuated. In this context, a first actuation signal AS1 is output to the first output stage 40 by the control device 52, and a second actuation signal AS2 is output by the control device 52 to the second output stage 44. The actuation signals AS1, AS2 may be, for example, three-phase signals by means of which transistor bridge circuits or thyristor bridge circuits in the output stages 40, 44 are actuated.

In the present case, the control device 52 contains a processor 54, which is embodied here as a microcontroller μC. In addition, the control device 52 contains a voltage monitoring device 56 by means of which the energy supply or the voltage supply of the control arrangement and/or of other electrical assemblies 50 is monitored. The control device 52 also contains a general monitoring device 58 which may be embodied, for example, as a watchdog module. The monitoring device 58 monitors, in particular, the function of the processor 54 (by means of interrogation mechanisms known per se, such as are carried out by watchdog modules). The monitoring device 58 may, under certain circumstances, also be connected to the voltage monitoring device 56, as is represented by dashed lines in FIG. 1.

On the processor 54 a multiplicity of software sections are implemented which can have a different degree of complexity, different levels and/or a different relevance with respect to safety. In the present case, a control software section 62 which includes the open-loop or closed-loop control algorithms for the friction clutches 22, 24 is implemented on the processor 54. The control software section 62 can for this purpose be supplied with suitable input signals (such as, for example, the actual position of the friction clutches, current transmission of the torque by the friction clutches etc.), which is not illustrated in FIG. 1 for reasons of clarity. The control software section 62 is a high-level section, but is preferably not safety-relevant.

On the processor 54, an output software section 64 is also implemented which is embodied as a low-level section. The output software section 64 is preferably safety-relevant.

A safety-relevant software section is preferably understood here as follows. A safety-relevant software section is preferably responsible for ensuring that safety objective infringements are detected and that the system can be transferred into a safe state within a specific time. Safety objective infringements are in this context preferably serious faults such as, for example, driving off in the wrong direction of travel. Further serious faults may be, for example, an undesired increase in engine torque due to spontaneous opening of the throttle, undesired starting etc. In contrast to this are non-serious faults, for example excessively gentle or excessively hard gear shifting, excessively early or excessively late gear shifting with a corresponding drop in the rotational speed or undesirably high rotational speeds. In addition, a safety-relevant software section may be software which has been checked to a particular degree for freedom from faults. A low-level software section preferably includes software which is close to hardware such as, for example, an operating system, BIOS, VIOS, driver etc. A high-level software section is software which is close to a function and which is generally placed upon the low-level software. A high-level software section may preferably implement all the functions which can be implemented by means of software. For example, a low-level software section can read in sensor signals, and actuate actuators etc. In particular, the low-level software section monitors sensor signals (short-circuits, interruptions). Complex subject matters in which a plurality of signals are evaluated in a complex diagnosis are assigned to the high-level software section. A complex subject matter is, for example, the detection of an incorrect direction of travel, in which case it is evaluated whether the selector lever in the vehicle has been set to the forward direction of travel, whether a reverse gear stage is engaged in the transmission and whether the assigned clutch transmits a torque which is greater than a specific threshold. Serious faults can be detected both by the low-level software section and by the high-level software section. Both software sections are preferably safety-relevant.

The output software section 64 receives from the control software section 62 superordinate control signals US1, US2 which contain, for example, a setpoint clutch position or similar setpoint values. The output software section 64 converts these superordinate control signals US1, US2 into control signals which contain for example the rotational speed and the direction of rotation for the first electric motor 38 and the rotational speed and the direction of rotation for the second electric motor 42. In the present case, the output software section 64 is also designed to convert these control signals into the actuation signals AS1, AS2 which can, for example, be three-phase signals for the output stages 40, 44.

In addition, a safety software section 66 is implemented on the processor 54. Said safety software section 66 is preferably a high-level section and is preferably a safety-relevant high-level section. The safety software section 66 monitors, by means of suitable measures, other software sections which are implemented on the processor 54 and/or the entire system (drive train 12 with or without drive engine 14). The safety software section 66 may in this context manage, for example, a fault characteristic variable which is a measure of the severity of disruption or of a fault.

The safety software section 66 preferably monitors the method of functioning and particularly preferably the fault characteristic variable of the control software section 62 and can, when necessary, initiate different measures. In addition, the safety software section 66 is connected to the output software section 64. The safety software section 66 is prioritized here over the control software section 62 as far as access to the output software section 64 is concerned. The output software section 64 manages a reset output R, to which the safety software section 66 has direct access. In addition, such a reset output R is also provided at the voltage monitoring device 56 and at the monitoring device 58. If a reset signal occurs at one of these reset outputs R (for example a changeover from 1 to 0), the output stages 40, 44, which have a reset input, are switched to the currentless state immediately. A reset signal is output, in particular, when it is necessary to reset and restart the processor 54. This is generally necessary only when a serious fault has occurred which is denoted here as a fault state of a first type of fault state.

In the case of resetting of the processor 54 and of a reset signal on the line R, the output stages 40, 44 are immediately switched to the currentless state, which causes the electric motors 38, 42 to no longer be able to transmit any drive power. In this case, the friction clutches 22, 24 are transferred into the safe state by means of the prestressing springs 30, 32. In this context, it is, under certain circumstances, necessary to entrain the electric motors 38, 42.

This transfer into the safe state is denoted here as passive transfer.

If another serious fault, which is denoted here as a fault state of the second type of fault state, is sensed by the safety software section 66, the safety software section 66 can also initiate active transfer of at least one of the friction clutches 22, 24 into the safe state by means of the output software section 64. In this context, as mentioned, the safety software section 66 is prioritized over the control software section 62.

Therefore, when a fault state of the second type of fault state is sensed, the safety software section 66 can cause the output software section 64 to transfer the friction clutches 22, 24 quickly into a safe state independently of the outputs of the control software section 62. For this purpose, the output software section 64 can in this case preferably generate signals by means of which the electric motors 38, 42 of the two friction clutches 22, 24 are quickly transferred into a safe state, which can involve, for example, a changeover of the direction of rotation. It is also possible to provide that the safety software section 66 does not transfer both friction clutches 22, 24 simultaneously into the safe state. If a fault state of the second type of fault state occurs which relates to only one of the two friction clutches, it may also be possible for the safety software section 66 to instruct the output software section 64 only to transfer the affected friction clutch into the safe state, that is to say to transfer only one of the two friction clutches 22, 24 actively into the safe state. At the end of such an action, a reset of the processor 54 or of the control device 52 can then preferably take place.

In a modified embodiment, the drive train 12 can also have just one friction clutch, for example in conjunction with an automated shift transmission. In addition, the drive train 12 can also contain one or more friction clutches in a twin clutch arrangement of a differential 18. It is also possible for the drive train 12 to include transverse locking clutches for locking an axle and/or longitudinal locking clutches for locking two driven axles of a motor vehicle. Generally it is possible that in this case just one actuator arrangement (for example 34) for activating one such friction clutch is provided. Alternatively, it is possible that for a multiplicity of such friction clutches respective actuator arrangements are also provided which are connected to the control device.

Finally, it is also possible that further actuator arrangements are monitored or actuated in the same way or a corresponding way by means of the control device 54, wherein the further actuator arrangements activate, for example, one or more clutches in a transmission or in the component transmissions 26, 28 and/or a parking lock in a transmission or one of the component transmissions 26, 28.

Figure 2:
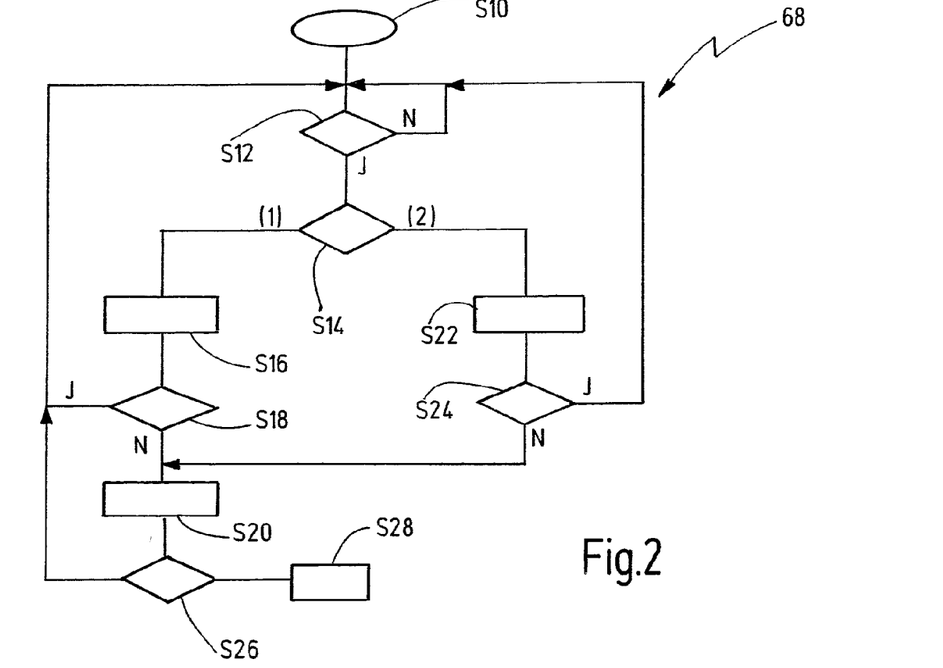
FIG. 2 shows a schematic flowchart for illustrating an embodiment of a method according to the invention.

FIG. 2 illustrates in a schematic form a method for actuating a component of a drive train of a motor vehicle, wherein the component is mechanically prestressed into a safe state. The method 68 starts from a starting state S10 at which, in a step S12, an interrogation as to whether a fault state is present occurs. If this is not the case, the method returns to the input of step S12. If a fault state (J in step S12) is sensed, a further interrogation occurs in step S14 as to whether the fault state is a first or a second type of fault state. If the fault state is a first type of fault state (1), a reset of the control device preferably takes place immediately in step S20. In an alternative method, the method changes over to step S16. In the step S16, the actuation of the component is immediately interrupted, with the result that the component is transferred passively into the safe state by the mechanical prestressing. Subsequent to the step S16, in a step S18 it is interrogated whether the fault state can be eliminated and at the same time is eliminated. If this is the case (J in step S18), the method returns to the input of step S12. Otherwise, a reset of the control device is firstly triggered, specifically in step S20. As stated, if the fault state is a first type of fault state (1), a reset preferably occurs in step S20 directly after the step S14, wherein the steps S16 and S18 are not carried out. After the reset in step S20, the control device runs up again immediately.

If a second type of fault state is sensed in step S14 (2), the method changes over to the step S22. In the step S22, the component is actuated in such a way that the component is transferred actively into the safe state. After the step S22, a reset is then preferably carried out in the step S20 in every case. In an alternative variant, subsequent to the step S22 an interrogation S24 which corresponds to the step S18 can take place, which interrogation S24 leads either to the input of the method or else to a reset of the control device (S20). After a reset of the control device, in a step S26 an interrogation takes place as to whether the number of the resets carried out at the control device is smaller than a predefined number. If this is the case, the method returns to the input of step S12. If the number of resets has exceeded the predefined reset number, the method changes over to the step S28. In step S28, the control device or the drive train is permanently switched off so that the motor vehicle is immobilized and that repair measures have to be initiated.

Figure 3:
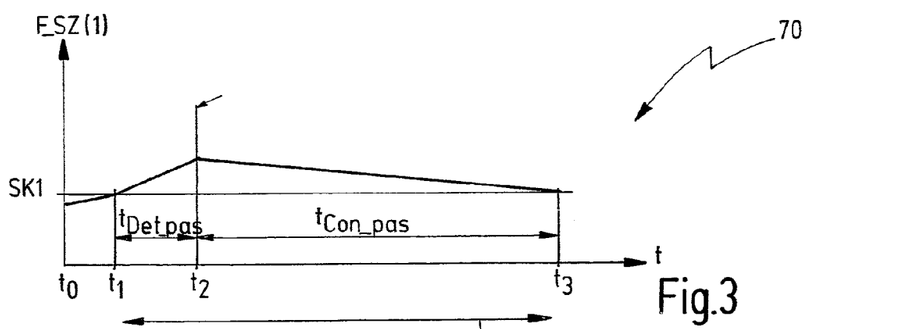
FIG. 3 shows a diagram of a safety characteristic variable plotted against the time when a fault of the first type of fault state is sensed.

FIG. 3 illustrates a diagram of a fault characteristic variable F_SZ plotted against the time t.

The fault characteristic variable F_SZ is a characteristic variable which is managed in the safety software section 66 which corresponds to the degree or the severity of a fault which has occurred. In the present case, a fault characteristic variable F_SZ(1) which is assigned to the first fault state is shown in the diagram 70. In this context, a first safety threshold SK1 is defined for the characteristic variable. As long as the characteristic variable F_SZ(1) is below the threshold SK1, a tolerable fault is present which does not require the initiation of technical safety measures. This is the case in FIG. 3 from the time t0 to t1. If the threshold SK1 is exceeded, after the expiry of a fault detection time tDet_pas at the time t2 passive transfer of the component into the safe state is initiated. This causes the component to be transferred into the safe state by means of the mechanical prestress, which can last for a relatively long time, and is shown in FIG. 3 from t2 to t3 (or at tCon_pas). At the time t3, the component is then transferred to such an extent into the safe state that the threshold SK1 is undershot again.

What is referred to as a safety time period 72 is defined from t1 to t3. This is a predefined time period which is dependent on the type of vehicle and/or various peripheral conditions and within which the drive train has to be transferred again into a safe state (at the time t3) after the detection of a fault (at the time t1). Since the passive transfer into the safe state can last for a relatively long time (small gradient of the characteristic value F_SZ in this case), the time t1 to t2 must be kept relatively short.

The time t1 to t2 can be, for example, in the range from 5 to 100 ms, wherein the safety time period 72 can be, for example, in the range from 150 to 500 ms.

Figure 4:
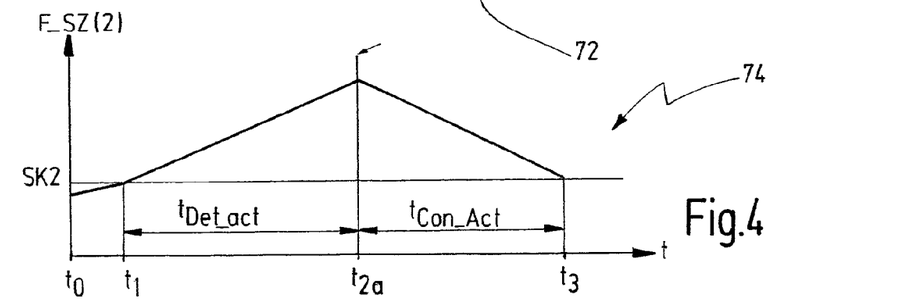
FIG. 4 shows an illustration of a safety characteristic variable corresponding to FIG. 3 when a fault of the second type of fault state is sensed.

FIG. 4 illustrates a diagram 74 which corresponds to FIG. 3 and which shows a characteristic variable F_SZ(2) which is assigned to a second type of fault state. A threshold value SK2 is also provided here. If the characteristic value F_SZ(2) exceeds the threshold value SK2 at the time t1, this fault state can be tolerated for a relatively long fault detection time tDet_act, specifically up to a time t2a. Only at this time is active transfer of the component into the safe state initiated, specifically through active actuation of the assigned actuator. As a result, the component can be transferred very much more quickly into the safe state (within the time period tCon_act in the time period from t2a to t3). Accordingly, even in the case of relatively long toleration of the characteristic value F_SZ(2) a safe state can still be reached within the safety time period (processing safety time) 72, which is equivalent to the safety time period shown in FIG. 3.

The characteristic values F_SZ(1) and F_SZ(2) can also be formed by a single characteristic value. The threshold values SK1, SK2 may also be identical.

In this case, it is differentiated, by means of a further characteristic value (not illustrated) whether a fault which has occurred is a fault of the first or of the second type of fault state.

Figure 5:
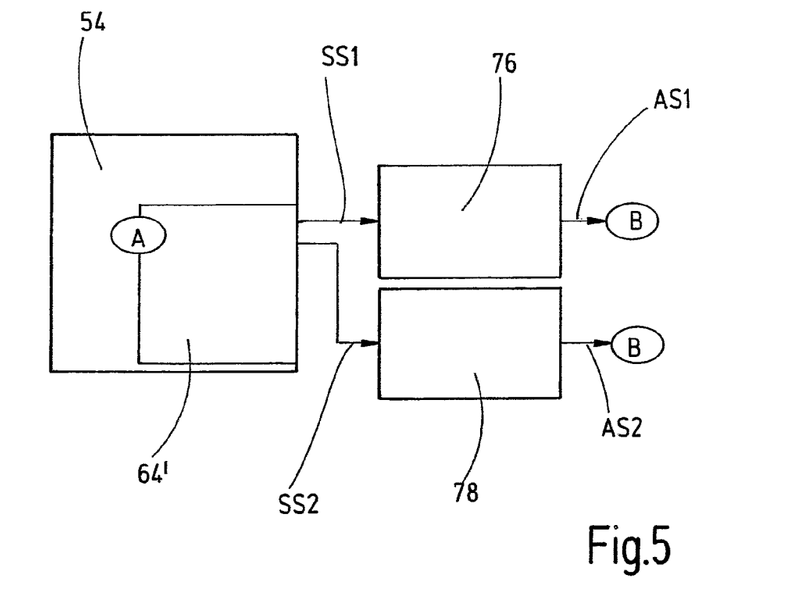
FIG. 5 shows an illustration of an alternative implementation of the control device in FIG. 1.
Figure 6:
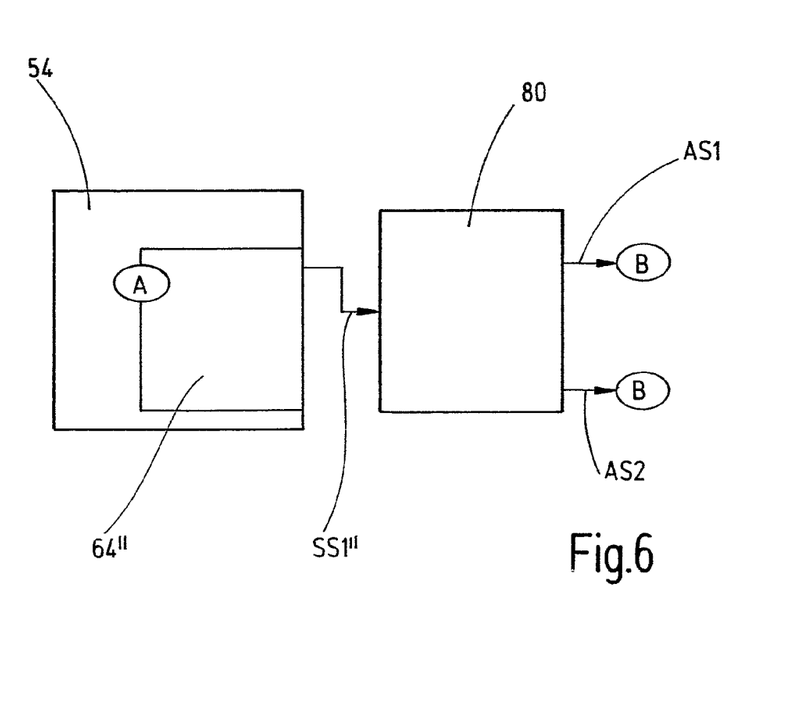
FIG. 6 shows a schematic illustration of a further alternative implementation of the control device in FIG. 1.

In FIGS. 5 and 6, variants of the control arrangement 50 in FIG. 1 are illustrated, wherein the variants can be inserted into the schema in FIG. 1 by means of connecting points A, B.

In the variant in FIG. 5, the processor 54 contains an output software section 64' whose structure and method of functioning corresponds to the output software section 64 in FIG. 1. In the present case, control signals SS1, SS2, which each represent, for example, a rotational speed and a direction of rotation of the respective electric motors, are output by the output software section 64'. These control signals SS1, SS2 are fed here to a first actuation module 76 or a second actuation module 78 which convert the control signals SS1, SS2 into respective actuation signals AS1, AS2. The actuation modules 76, 78 may be, for example, ASIC modules, which are preferably implemented on an engine-specific basis.

FIG. 6 shows a variant in which the processor 54 has an output software section 64" which generally corresponds, in terms of design and method of functioning, to the output software section 64' in FIG. 5. The output software section 64" only outputs one signal SS1" here, which signal SS1" is fed to an individual common actuation module 80. The signal SS1" may include here the rotational speeds and the directions of rotation of one or more electric motors. The common actuation module 80 converts the control signal SS1" in turn into the actuation signals AS1, AS2.

Further functions of the control arrangement 50, which are necessary to transfer a component into a safe state (for example the evaluation of sensor signals etc.), can be implemented either by intelligent modules (ASICs, processors etc.) or by software sections. Such software sections are safety-relevant in this case and are therefore preferably implemented in a safety-relevant low-level software section.

The invention claimed is:

1. A method for actuating a component of a drive train of a motor vehicle, wherein the component has a safe state, wherein the component can be actively transferred into the safe state by means of an actuator, wherein the component is mechanically prestressed into the safe state, and wherein the component can be passively transferred into the safe state by means of a mechanical prestress, the method having the steps:
   sensing a fault state,
   when the sensed fault state is a first type of fault state, then immediately interrupting an actuation of the component by switching the actuator to a currentless state so that the component is passively transferred into the safe state by the mechanical prestress, and when the sensed fault state is a second type of fault state, then enabling an actuation of the component in such a way that the component is actively transferred into the safe state by the actuator.

2. The method according to claim 1, wherein the first type of fault state includes a processor fault of a control device.

3. The method according to claim 2, wherein at least one of the first and the second type of fault state is sensed by a monitoring device which monitors a processor of at least one of a control device and an energy supply of the control device.

4. The method according to claim 1, wherein the first type of fault state includes an energy supply fault, in which the energy supply for a control device is faulty.

5. The method according to claim 1, wherein the second type of fault state includes a software fault in a control software section.

6. The method according to claim 5, wherein the control software section is connected to an output software section which outputs signals at at least one processor output.

7. The method according to claim 6, wherein the safety software section is connected to the output software section in order to carry out the active state transfer into the safe state.

8. The method according to claim 6, wherein the output software section outputs control signals to the at least one processor output, which control signals are converted by means of actuation hardware into actuation signals for an actuator arrangement for activating the component.

9. The method according to claim 1, wherein at least one of the first and the second type of fault state is sensed by a safety software section.

10. The method according to claim 1, wherein an output software section is installed on a processor of a control device for activating a component of a drive train, which output software section is configured to convert control signals into actuation signals which can be used directly to actuate an actuator arrangement for activating the component.

11. The method according to claim 1, wherein the mechanical prestress is configured in such a way that the passive state transfer into the safe state takes place within a first predefined time period which is shorter than a safety time period minus a first fault detection time period.

12. The method according to claim 1, wherein actuation dynamics of the component are configured in such a way that the active state transfer into the safe state takes place within a second predefined time period which is shorter than a safety time period minus a second fault detection time period.

13. The method according to claim 1, wherein an actuator arrangement which is used to activate the component has an electric motor.

14. A control device for controlling a component of a drive train of a motor vehicle, wherein the control device is implemented to conduct a method for actuating a component of the drive train, wherein the component has a safe state, wherein the component can be actively transferred into the safe state by means of an actuator, wherein the component is mechanically prestressed into the safe state, and wherein the component can be passively transferred into the safe state by means of a mechanical prestress, having:
a sensor for sensing a fault state,
when the sensed fault state is a first type of fault state, then the control device immediately interrupts the actuation of the component by switching the actuator to a currentless state so that the component is passively transferred into the safe state by the mechanical pre-stress, and when the sensed fault state is a second type of fault state, then actuating the component in such a way that the component is actively transferred into the safe state by the actuator.

15. The control device according to claim 14, wherein the first type of fault state includes a processor fault of a control device.

16. The control device according to claim 15, wherein at least one of the first and the second type of fault state is sensed by a monitoring device which monitors a processor of at least one of a control device and an energy supply of the control device.

17. The control device according to claim 14, wherein the first type of fault state includes an energy supply fault, in which the energy supply for a control device is faulty.

18. The control device according to claim 14, wherein the second type of fault state includes a software fault in a control software section.

19. The control device according to claim 14, wherein at least one of the first and the second type of fault state is sensed by a safety software section.

20. The control device according to claim 19, wherein the control software section is connected to an output software section which outputs signals at at least one processor output.

21. The control device according to claim 14, wherein the mechanical prestress is configured in such a way that the passive state transfer into the safe state takes place within a first predefined time period which is shorter than a safety time period minus a first fault detection time period.

22. The control device according to claim 14, wherein actuation dynamics of the component are configured in such a way that the active state transfer into the safe state takes place within a second predefined time period which is shorter than a safety time period minus a second fault detection time period.

23. The control device according to claim 14, wherein an actuator arrangement which is used to activate the component has an electric motor.

* * * * *